(12) United States Patent
Lin et al.

(10) Patent No.: US 8,218,244 B2
(45) Date of Patent: Jul. 10, 2012

(54) MINIATURE ZOOM LENS

(75) Inventors: Shih-Mu Lin, Taipei (TW); Chao-Hung Lin, Taipei (TW); Sheng-Fang Cheng, Hsinchu County (TW)

(73) Assignee: A-Optronics Technology Inc., Hsinchu (TW)

( * ) Notice: Subject to any disclaimer, the term of this patent is extended or adjusted under 35 U.S.C. 154(b) by 51 days.

(21) Appl. No.: 12/951,307

(22) Filed: Nov. 22, 2010

(65) Prior Publication Data
US 2012/0127588 A1 May 24, 2012

(51) Int. Cl.
*G02B 15/14* (2006.01)
(52) U.S. Cl. ........................ 359/682; 359/684
(58) Field of Classification Search .................. 359/680, 359/682, 683, 684
See application file for complete search history.

(56) References Cited

U.S. PATENT DOCUMENTS

| | | | |
|---|---|---|---|
| 7,019,912 B2* | 3/2006 | Saori | 359/682 |
| 7,085,067 B2* | 8/2006 | Enomoto | 359/680 |
| 7,145,730 B2 | 12/2006 | Mihara | |
| 7,312,930 B2* | 12/2007 | Murakami et al. | 359/682 |
| 7,339,745 B2* | 3/2008 | Hozumi et al. | 359/682 |
| 7,339,749 B2 | 3/2008 | Katakura | |
| 7,417,800 B2* | 8/2008 | Saori | 359/682 |
| 7,453,507 B2* | 11/2008 | Morooka | 348/335 |
| 7,605,986 B2* | 10/2009 | Hung et al. | 359/682 |
| 8,054,560 B2* | 11/2011 | Lin et al. | 359/687 |
| 2009/0034067 A1 | 2/2009 | Katakura | |
| 2009/0034092 A1 | 2/2009 | Eguchi | |
| 2009/0052052 A1 | 2/2009 | Yamano | |

* cited by examiner

*Primary Examiner* — David N Spector
(74) *Attorney, Agent, or Firm* — Rosenberg, Klein & Lee

(57) ABSTRACT

A miniature zoom lens includes a first, a second and a third lens groups arranged along an optical axis and from an object side to an image side in sequence. The refractive powers of the three lens groups are negative, positive and positive, respectively. The first lens group is fixed at a predetermined position. The second lens group is movable along the optical axis in accordance with a change of magnification. The third lens group is movable along the optical axis for keeping an image plane fixed at an image sensor. The first lens group is in resting state and the second and the third lens groups are movable during zoom-in or zoom-out operation of the miniature zoom lens. In addition, the miniature zoom lens can be composed of at least seven pieces of lens, thus the cost is reduced, the manufacture is easy and the assembly is simple.

10 Claims, 12 Drawing Sheets

MINIATURE ZOOM LENS

BACKGROUND OF THE INVENTION

1. Field of the Invention

The instant disclosure relates to a miniature zoom lens, and more particularly, to a miniature zoom lens applied to an image-capturing device such as DV (digital video), DSC (digital still camera), etc.

2. Description of Related Art

With the rapid development of video technologies, imaging devices such as digital video cameras and digital cameras have found widespread applications. The core element of these imaging devices is a zoom lens. By varying the optical focus of the zoom lens, a clean image can be focused on a charge-coupled device. The optical quality of the zoom lens is closely related to the imaging quality, thus it is very important to improve the quality of the zoom lens.

Moreover, the known zoom lens usually uses CCD or CMOS as an image sensor for achieving 3× zoom ratio, as shown in U.S. Pat. No. 7,339,749, US 2009/0034067, US 2009/0034092, etc. Any one of the related arts uses three lens groups including a first lens group with negative refractive power, a second lens group with positive refractive power, and a third lens group with positive refractive power. The first, the second and the third lens groups are arranged from an object side to an image side of the zoom lens in sequence. However, the three lens groups are movable structure, thus the cost of the zoom lens is increased. In addition, the first lens group is a compensation group, thus the manufacture of the mechanism of the zoom lens is difficult.

Furthermore, some related arts such as U.S. Pat. No. 7,145,730 and US 2009/0052052 disclose an optical system using a right-angle prism that is used to change the optical axis or optical path of the zoom lens by 90 degrees. However, the related arts use more than eight lens and three moved lens groups, thus the cost of the related arts are increased.

SUMMARY OF THE INVENTION

One particular aspect of the instant disclosure is to provide a miniature zoom lens having some characteristics, for example, the cost is reduced, the manufacture is easy, the assembly is simple and the size is compact.

To achieve the above-mentioned advantages, one embodiment provides a miniature zoom lens including a first lens group with negative refractive power, a second lens group with positive refractive power, and a third lens group with positive refractive power. The first lens group is fixed at a predetermined position. The second lens group is movable along an optical axis of the zoom lens in accordance with the change of the magnification of the zoom lens. The third lens group is movable along the optical axis in order to keep an image plane generated by the zoom lens to project accurately onto an image sensor. In addition, the first, the second and the third lens groups are arranged along the optical axis and from an object side of the zoom lens to an image side of the zoom lens in sequence. In addition, the first lens group and the second lens group may conform to the following conditions (1) and (2):

$$\text{condition (1): } 1.2 < \frac{F_2}{\sqrt{F_W \cdot F_T}} < 1.5; \text{ and}$$

$$\text{condition (2): } 1.1 \le \left|\frac{F1}{F2}\right| \le 1.25;$$

wherein F1 is the focal length of the first lens group, F2 is the focal length of the second lens group, $F_W$ is the total focal length at wide-configuration of the zoom lens, and $F_T$ is the total focal length at tele-configuration of the zoom lens.

Therefore, the instant disclosure has some advantages, for example:

1. The miniature zoom lens of the instant disclosure uses three lens groups only, and the miniature zoom lens has an inner focus structure. In other words, the first lens group is in resting state and the second and the third lens groups are movable during zoom-in or zoom-out operation (the magnification is variable) of the miniature zoom lens, thus the cost is reduced, the manufacture is easy and the assembly is simple in the instant disclosure.

2. The aperture value of the miniature zoom lens of the instant disclosure is adjustable according to different image-capturing applications. For example, when using large aperture value to capture dynamic image, Fno needs to be small; when using high resolution to capture static image, Fno needs to be large.

3. In the miniature zoom lens of the instant disclosure, the first lens group may be composed of at least three lenses, the second lens group may be composed of at least three lenses, and the third lens group may be composed of at least one lens. Hence, the miniature zoom lens can be composed of at least seven pieces of lens for achieving cost is reduced, thus the cost is reduced, the manufacture is easy and the assembly is simple in the instant disclosure.

To further understand the techniques, means and effects the instant disclosure takes for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention that they be used for limiting the instant disclosure.

DETAILED DESCRIPTION OF THE PREFERRED EMBODIMENTS

Figure 1A:
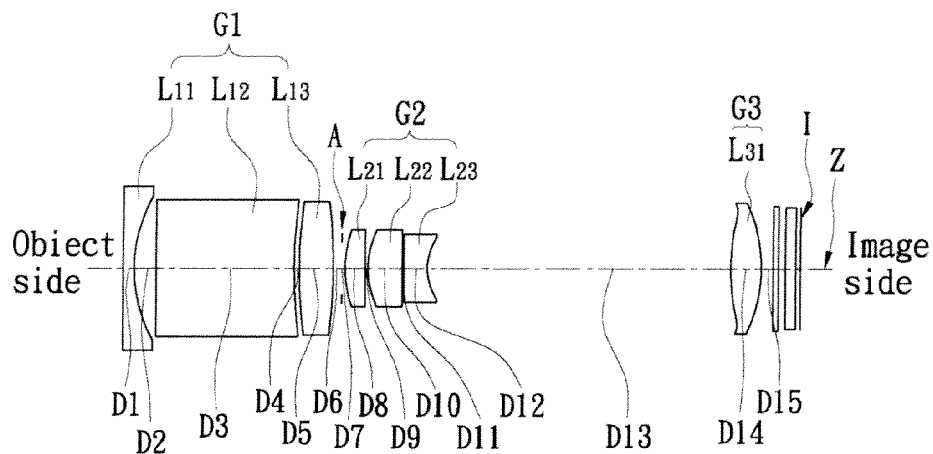
FIGS. 1A-1C are schematic views of the lens groups arranged at wide-configuration of the zoom lens, normal-configuration and tele-configuration according to the first embodiment of the instant disclosure, respectively.
Figure 1B:
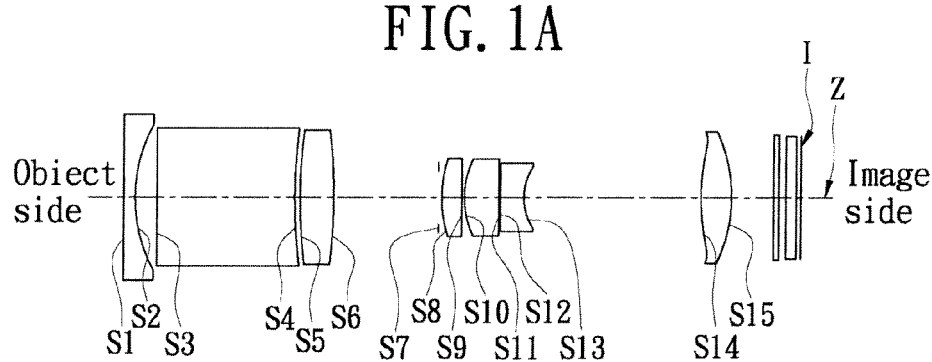
Figure 1C:
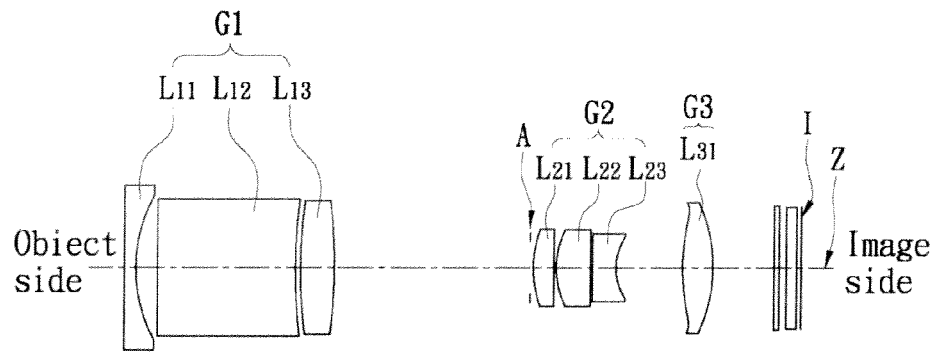

FIGS. 1A to 1C show schematic views of the lens groups of the zoom lens arranged at wide-configuration (FIG. 1A), normal-configuration (FIG. 1B) and tele-configuration (FIG. 1C) according to the first embodiment, respectively. The numbers D1-D15 in FIG. 1A are serial numbers of distances between every two optical surfaces of every two lenses, and the numbers S1-S15 in FIG. 1B are serial numbers of optical surfaces of the lenses.

The miniature zoom lens of the first embodiment may be composed of seven pieces of lens and includes a first lens group G1, a second lens group G2 and a third lens group G3 as shown in FIGS. 1A to 1C. The refractive powers of the second lens group G2 and the third lens group G3 are positive, and refractive power of the first lens group G1 is negative. In addition, the focal length of the zoom lens is changeable according to the interval variation between any two lens groups arranged along the optical axis Z of the zoom lens.

In the preferred embodiment, the first lens group G1 may include a first lens $L_{11}$, a right-angle prism $L_{12}$ and a second lens $L_{13}$ that may be arranged along the optical axis Z in sequence. The second lens group G2 may include a first lens $L_{21}$, a second lens $L_{22}$ and a third lens $L_{23}$ that may be arranged along the optical axis Z in sequence. The third lens group G3 may be at least one single first lens $L_{31}$. In addition, the zoom lens has an aperture A arranged in front of the first lens $L_{21}$ of the second lens group G2 (it means that the aperture A may be arranged along the optical axis Z and between the first lens group G1 and the second lens group G2), the aperture A can be moved with the second lens group G2, and the diameter of the aperture A can be changeable.

In other words, the first lens group G1 with negative refractive power is fixed at a predetermined position. The second lens group G2 with positive refractive power is movable along an optical axis Z of the zoom lens in accordance with the change of the magnification of the zoom lens. The third lens group G3 with positive refractive power is movable along the optical axis Z in order to keep an image plane generated by the zoom lens to project accurately onto an image sensor I. In addition, the first, the second and the third lens groups (G1, G2, G3) are arranged along the optical axis Z and from an object side of the zoom lens to an image side of the zoom lens in sequence.

For example, the first lens group G1 and the second lens group G2 may conform to the following conditions (1) and (2) in order to achieve the objects of the zoom lens having small size and good image quality:

$$\text{condition (1): } 1.2 < \frac{F_2}{\sqrt{F_W \cdot F_T}} < 1.5; \text{ and}$$

$$\text{condition (2): } 1.1 \leq \left|\frac{F1}{F2}\right| \leq 1.25;$$

wherein F1 is the focal length of the first lens group G1, F2 is the focal length of the second lens group G2, $F_W$ is the total focal length at wide-configuration of the zoom lens, and $F_T$ is the total focal length at tele-configuration of the zoom lens.

Moreover, the first lens group G1 may includes a first lens $L_{11}$, a right-angle prism $L_{12}$ disposed beside the first lens $L_{11}$ for changing the optical axis Z by 90 degrees substantially, and a second lens $L_{13}$ with positive refractive power disposed beside the right-angle prism $L_{12}$. For example:

(A) The first lens $L_{11}$ and the second lens $L_{13}$ of the first lens group G1 may conform to the following condition (3):

$$\text{condition (3): } 2.1 \leq \left|\frac{F_{12}}{F_{11}}\right| \leq 2.5;$$

wherein $F_{11}$ is the focal length of the first lens $L_{11}$ and $F_{12}$ is the focal length of the second lens $L_{13}$.

(B) The first lens group G1 may be a front fixing group, the first lens $L_{11}$ may be a meniscus lens, and the second lens $L_{13}$ may be a double-convex lens.

(C) The first lens $L_{11}$ and the second lens $L_{13}$ may be made of glass material having a refractive index larger than 1.8.

Furthermore, the second lens group G2 may includes a first lens $L_{21}$, a second lens $L_{22}$ disposed beside the first lens $L_{21}$, and a third lens $L_{23}$ disposed beside the second lens $L_{21}$, and the first, the second and the third lenses ($L_{21}$, $L_{22}$, $L_{23}$) of the second lens group G2 are arranged along the optical axis Z and from the object side of the zoom lens to the image side of the zoom lens in sequence. For example:

(A) The second lens $L_{22}$ and the third lens $L_{23}$ of the second lens group G2 may conform to the following condition (4):

$$\text{condition (4): } 1.5 \leq \left|\frac{F_{22}}{F_{23}}\right| \leq 2.0;$$

wherein $F_{22}$ is the focal length of the second lens $L_{22}$ and $F_{23}$ is the focal length of the third lens $L_{23}$.

(B) The second lens group G2 may be a variable-power group, the first lens $L_{21}$ may be a single convex lens, and the second lens $L_{22}$ and the third lens $L_{23}$ may be two meniscus lenses separated from each other by a predetermined distance for respectively control field curvature and axial color of the zoom lens. In addition, the focal length ratio of the positive refractive power to the negative refractive power for each meniscus lens is about 1:2.

(C) The ratio of the focal length of the first lens L21 to the focal length of the second lens group G2 is shown as the following condition (5):

$$\text{condition (5): } 1.85 \leq \frac{F_{21}}{F2} \leq 1.2;$$

wherein $F_{21}$ is the focal length of the first lens $L_{21}$ and F2 is the focal length of the second lens group G2.

(D) The miniature zoom lens of claim 6, wherein the third lens of the second lens group is made of glass material having a refractive index larger than 1.8 and an Abbe value (Abbe value means chromatic dispersion of material) less than 30.

(E) The ratio of the focal length of the second lens group G2 to the total length of the zoom lens is between about 0.3 and about 0.35.

In addition, the zoom lens may be applied to an image-capturing device such as conventional camera, digital camera or digital video camera etc. In other words, the first lens group G1, the second lens group G2 and the third lens group G3 may be assembled in the image-capturing device to capture images.

Figure 1D:
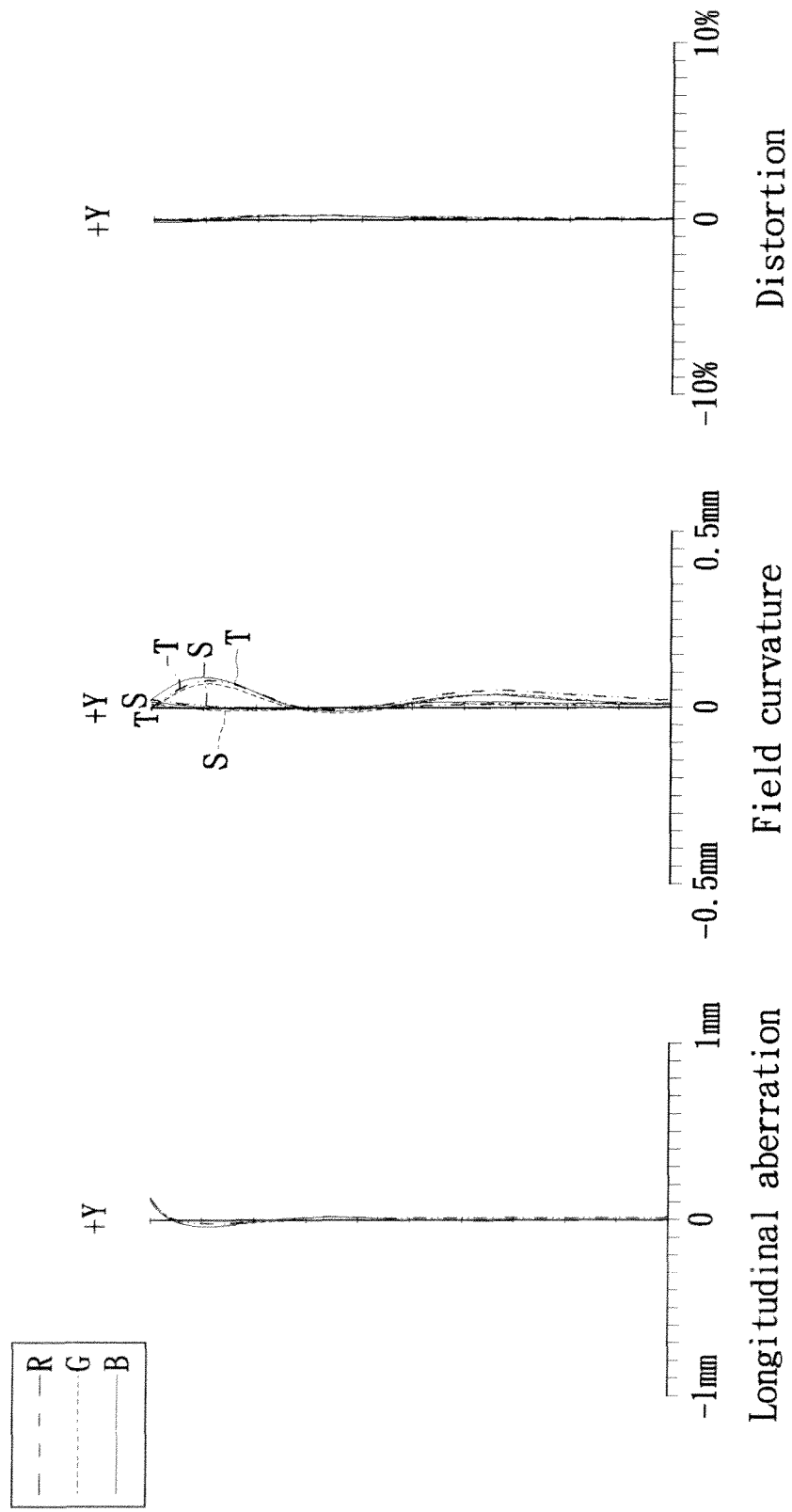
FIGS. 1D-1F are graphs showing longitudinal aberration (left), field curvature (middle) and distortion (right) of the zoom lens at wide-configuration, normal-configuration and tele-configuration according to the first embodiment of the instant disclosure, respectively.
Figure 1E:
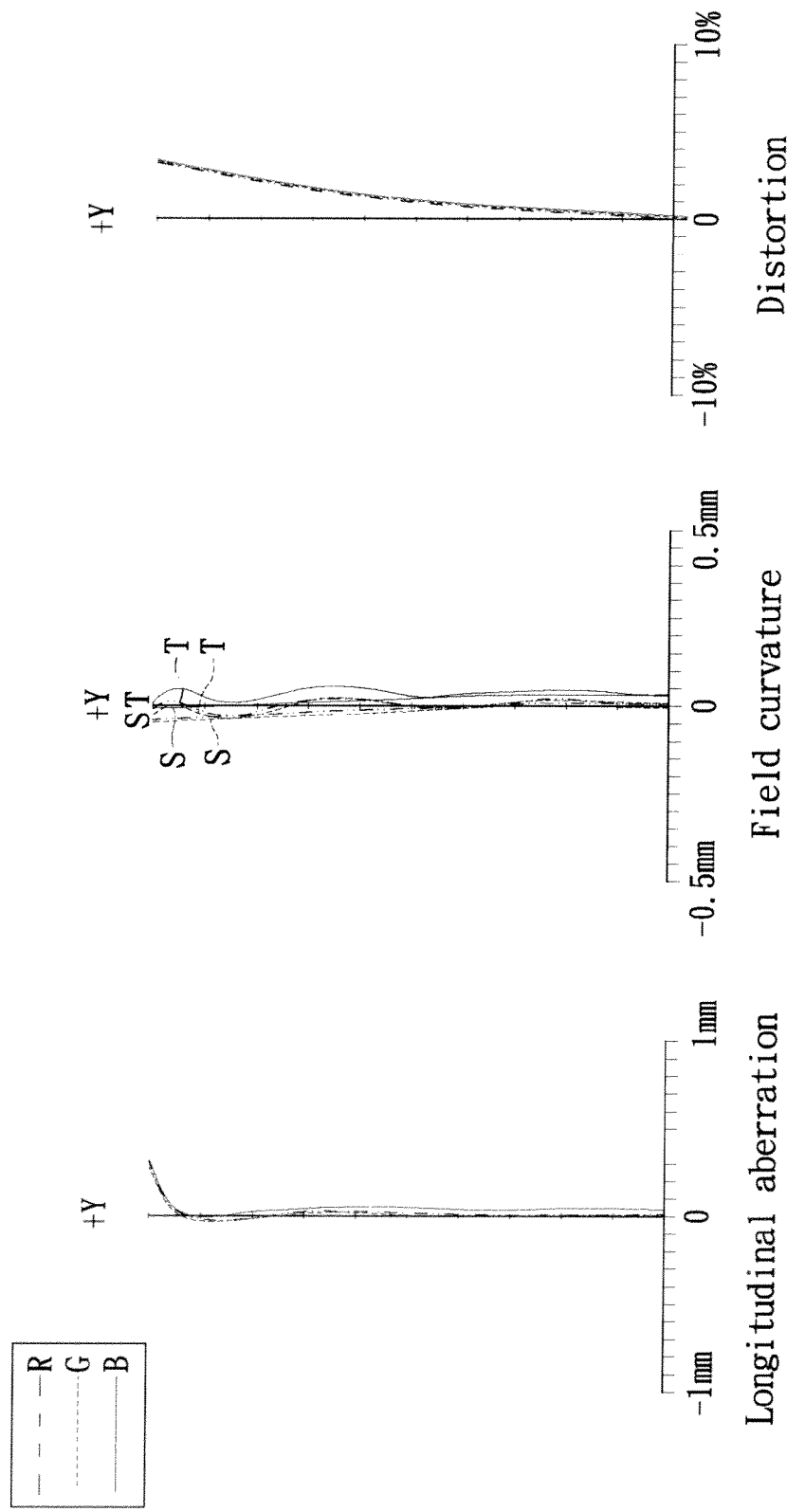
Figure 1F:
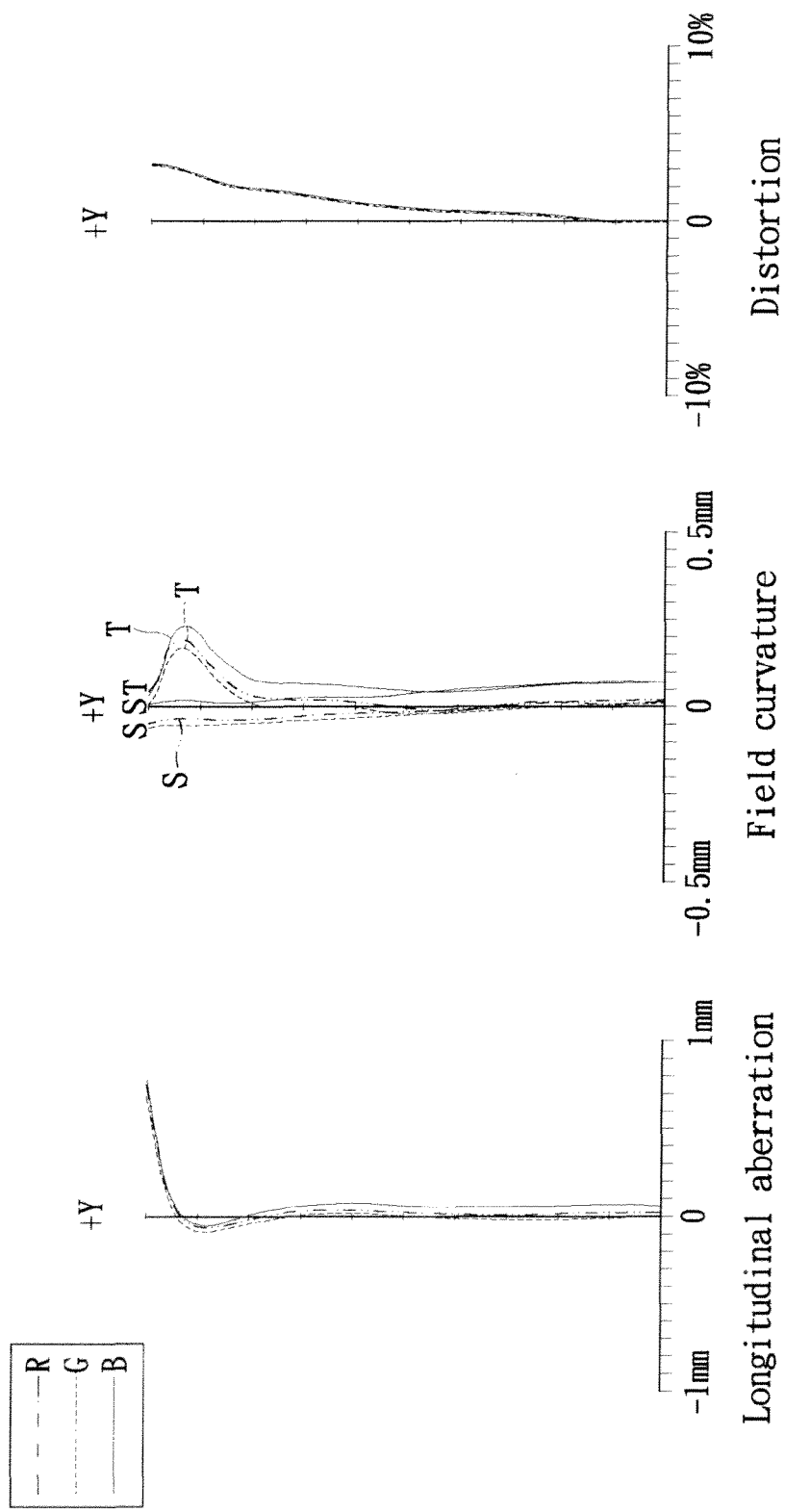

Referring to FIGS. 1D to 1F, where FIG. 1D is a graph showing longitudinal aberration (left), field curvature (middle) and distortion (right) of the zoom lens at wide-configuration according to the first embodiment, respectively. FIG. 1E is a graph showing longitudinal aberration (left), field curvature (middle) and distortion (right) of the zoom lens at normal-configuration according to the first embodiment, respectively. FIG. 1F is a graph showing longitudinal aberration (left), field curvature (middle) and distortion (right) of the zoom lens at tele-configuration according to the first embodiment, respectively.

The simulation data of the first embodiment are shown as the following table, where R shows curvature radius of optical surface of each lens (serial numbers are shown from S1 to S15), D shows axial distance between two optical surfaces of every two adjacent lenses (serial numbers are shown from D1 to D15), $n_d$ shows refractive index of optical surface of each lens, and $V_d$ shows Abbe value of optical surface of each lens.

| surface number | R (curvature radius) | D (distance) | $n_d$ (refractive index) | $V_d$ (Abbe value) |
|---|---|---|---|---|
| 1 | Infinity | 0.50 | 1.83 | 42.7 |
| 2 | 7.10 | 1.08 | | |
| 3 | −556.70 | 6.82 | 1.53 | 56.0 |
| 4 | 25.03 | 0.25 | | |
| 5 | 34.06 | 1.60 | 1.85 | 23.8 |
| 6 | −34.06 | Variable | | |
| 7 | Infinity | 0.10 | | |
| 8 | 4.94 | 1.00 | 1.53 | 56.0 |
| 9 | 61.05 | 0.10 | | |
| 10 | 4.32 | 1.70 | 1.53 | 56.0 |
| 11 | −62.53 | 0.10 | | |
| 12 | 55.16 | 1.20 | 1.85 | 23.8 |
| 13 | 3.13 | Variable | | |
| 14 | 11.29 | 1.47 | 1.53 | 56.0 |
| 15 | −9.01 | Variable | | |

The relationships of the variance D7, D13 and D19 relative to different zoom position are shown as the following table:

| | Wide | Normal | Tele |
|---|---|---|---|
| f | 6.62 | 15.03 | 31.78 |
| $F_{NO}$ | 2.84 | 3.1 | 3.26 |
| FOV(ω) | 32.7° | 21.0° | 12.5° |
| D7 | 9.89 | 5.33 | 0.54 |
| D13 | 3.05 | 9.06 | 15.06 |
| D19 | 3.16 | 1.72 | 0.49 |

Where f is system focal length at wide-configuration, normal-configuration and tele-configuration. $F_{NO}$ is aperture radius at wide-configuration, normal-configuration and tele-configuration, and FOV(ω) is view angle at wide-configuration, normal-configuration and tele-configuration.

Moreover, the optical surface S3, S4, S8-S11 and S14-S15 are aspherical surfaces, and the data of the aspherical surfaces are shown as the following table:

| Surface | K | $A_4$ | $A_6$ | $A_8$ | $A_{10}$ | $A_{12}$ | $A_{14}$ | $A_{16}$ |
|---|---|---|---|---|---|---|---|---|
| S3 | −306 | 3.64E−4 | 1.57E−5 | 2.97E−6 | −6.68E−7 | 4.87E−8 | −1.42E−9 | 1.14E−11 |
| S4 | 42.79 | −4.78E−4 | −2.60E−5 | 6.06E−6 | −5.65E−7 | −5.67E−8 | 9.59E−9 | −3.81E−10 |
| S8 | 0.11 | −1.28E−3 | −1.68E−5 | −4.61E−4 | 4.86E−4 | −2.43E−4 | 5.80E−5 | −5.94E−6 |
| S9 | −52.21 | −1.87E−4 | 3.14E−5 | −1.36E−5 | −8.06E−6 | −6.69E−5 | 2.29E−5 | −2.52E−6 |
| S10 | 0 | 2.27E−4 | 8.11E−4 | −1.85E−4 | 5.68E−5 | −9.97E−5 | 4.00E−5 | −5.28E−6 |
| S11 | 0 | 5.91E−3 | 1.48E−3 | −1.03E−3 | 3.82E−4 | 1.15E−4 | −1.05E−4 | 1.59E−5 |
| S14 | −4.81 | −8.11E−4 | 6.33E−4 | −2.52E−4 | 4.27E−5 | −4.22E−6 | 2.44E−7 | −7.82E−9 |
| S15 | 0 | 7.15E−4 | −1.53E−4 | 5.41E−5 | −2.41E−5 | 3.94E−6 | −2.88E−7 | 7.21E−9 |

In addition, the above-mentioned aspherical surfaces in the first embodiment are represented by the following expression:

$$Z = \frac{CY^2}{1+\sqrt{1-(K+1)C^2Y^2}} + \sum_{2}^{8} A_{2n} Y^{2n};$$

wherein Z is sag, C (=1/r) is the curvature of aspherical surface, K is the conic constant, Y is high vertical to the optical axis Z, $A_4$ is the 4$^{th}$ aspherical coefficient, $A_6$ is the 6$^{th}$ aspherical coefficient, and $A_8$ to $A_{16}$ may be deduced by analogy.

Figure 2A:
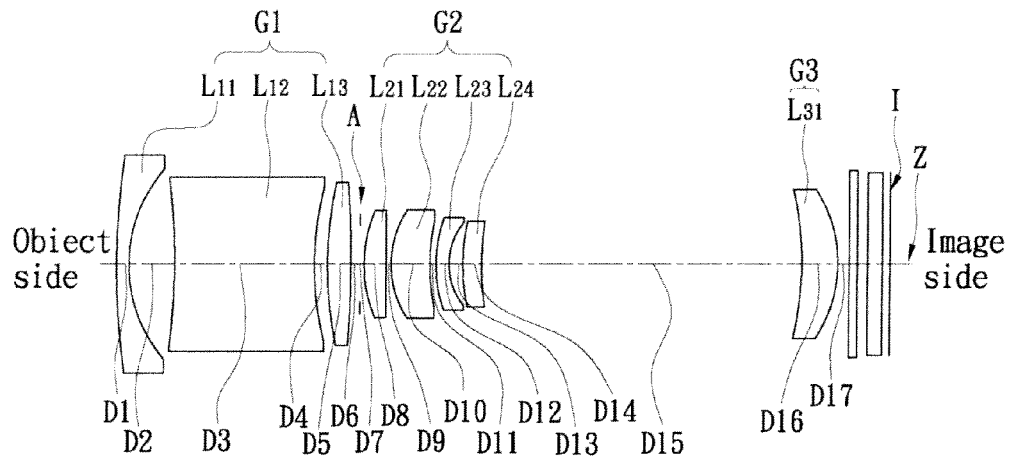
FIGS. 2A-2C are schematic views of the lens groups arranged at wide-configuration of the zoom lens, normal-configuration and tele-configuration according to the second embodiment of the instant disclosure, respectively.
Figure 2B:
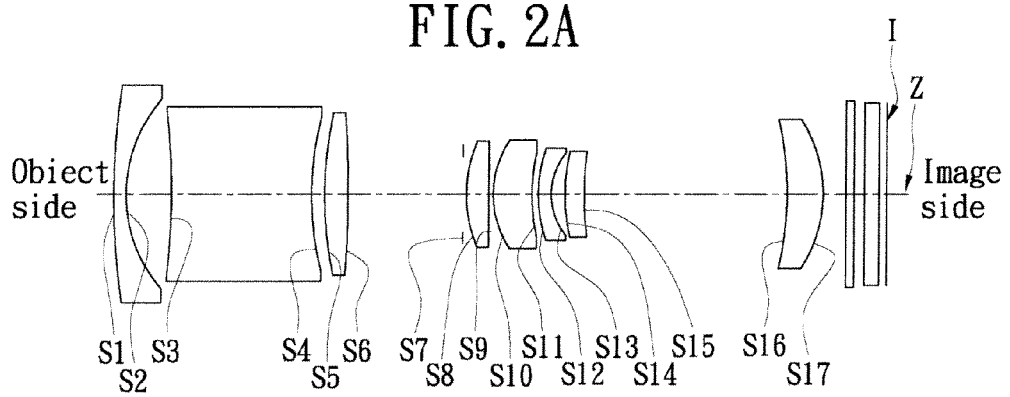
Figure 2C:
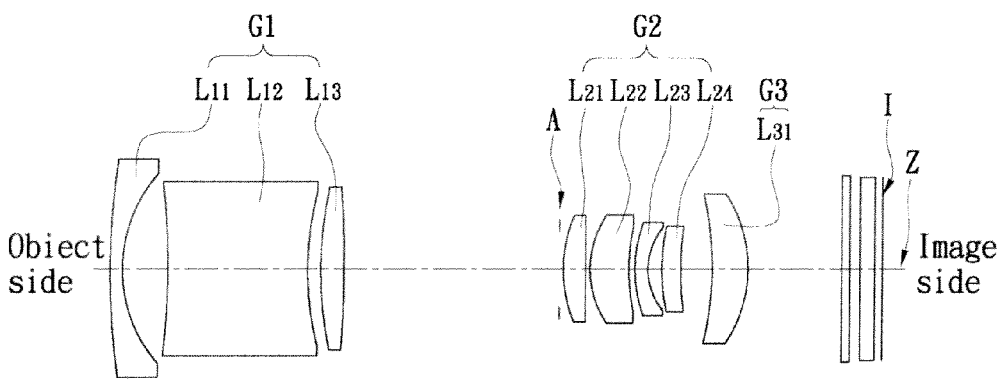

FIGS. 2A to 2C show schematic views of the lens groups of the zoom lens arranged at wide-configuration (FIG. 2A), normal-configuration (FIG. 2B) and tele-configuration (FIG. 2C) according to the second embodiment, respectively. The difference between the second embodiment and the first embodiment is that: in second embodiment, the second lens group G2 further includes an extra fourth lens L24, thus the miniature zoom lens of the second embodiment may be composed of eight pieces of lens.

Figure 2D:
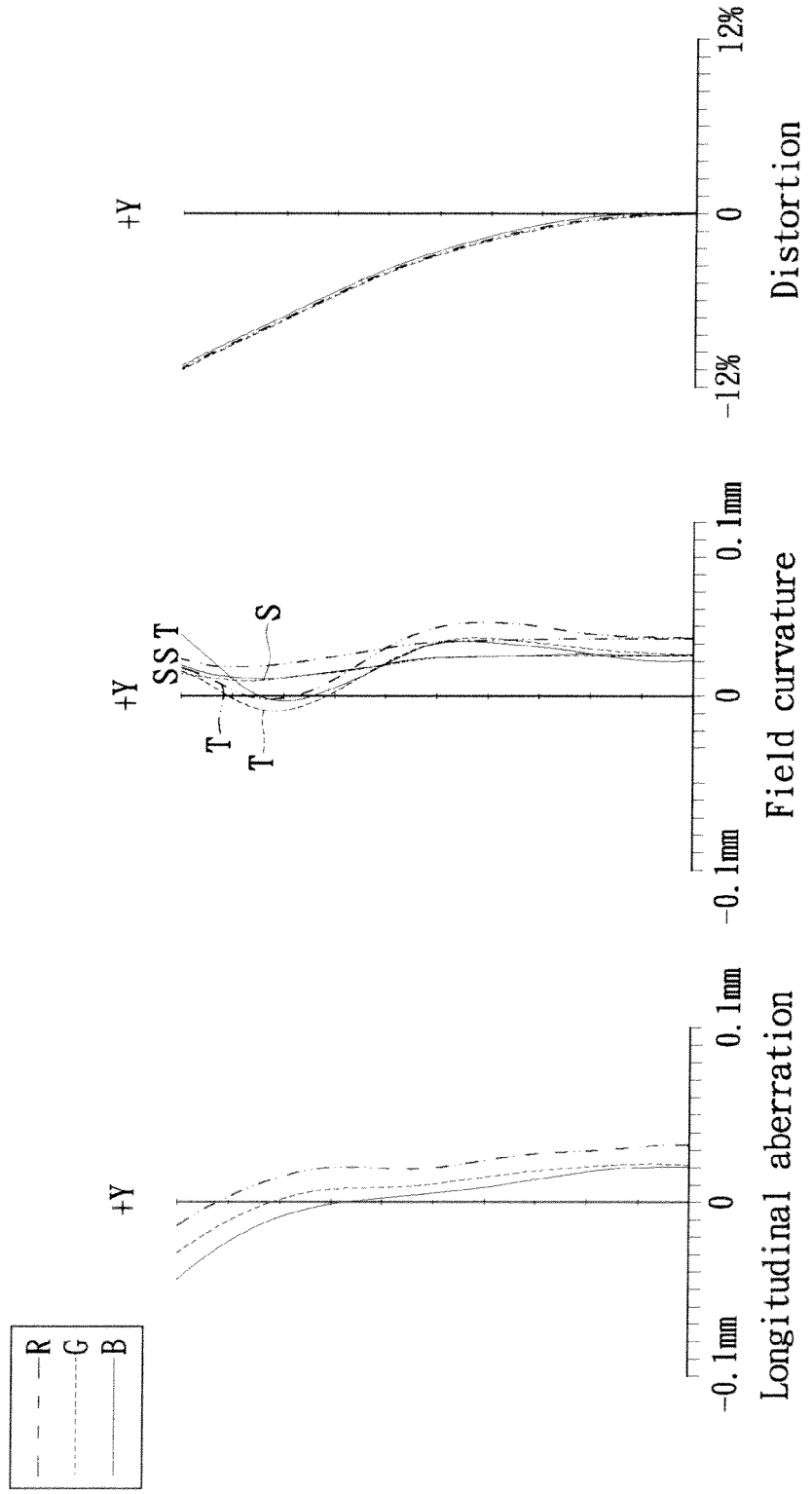
FIGS. 2D-2F are graphs showing longitudinal aberration (left), field curvature (middle) and distortion (right) of the zoom lens at wide-configuration, normal-configuration and tele-configuration according to the second embodiment of the instant disclosure, respectively.
Figure 2E:
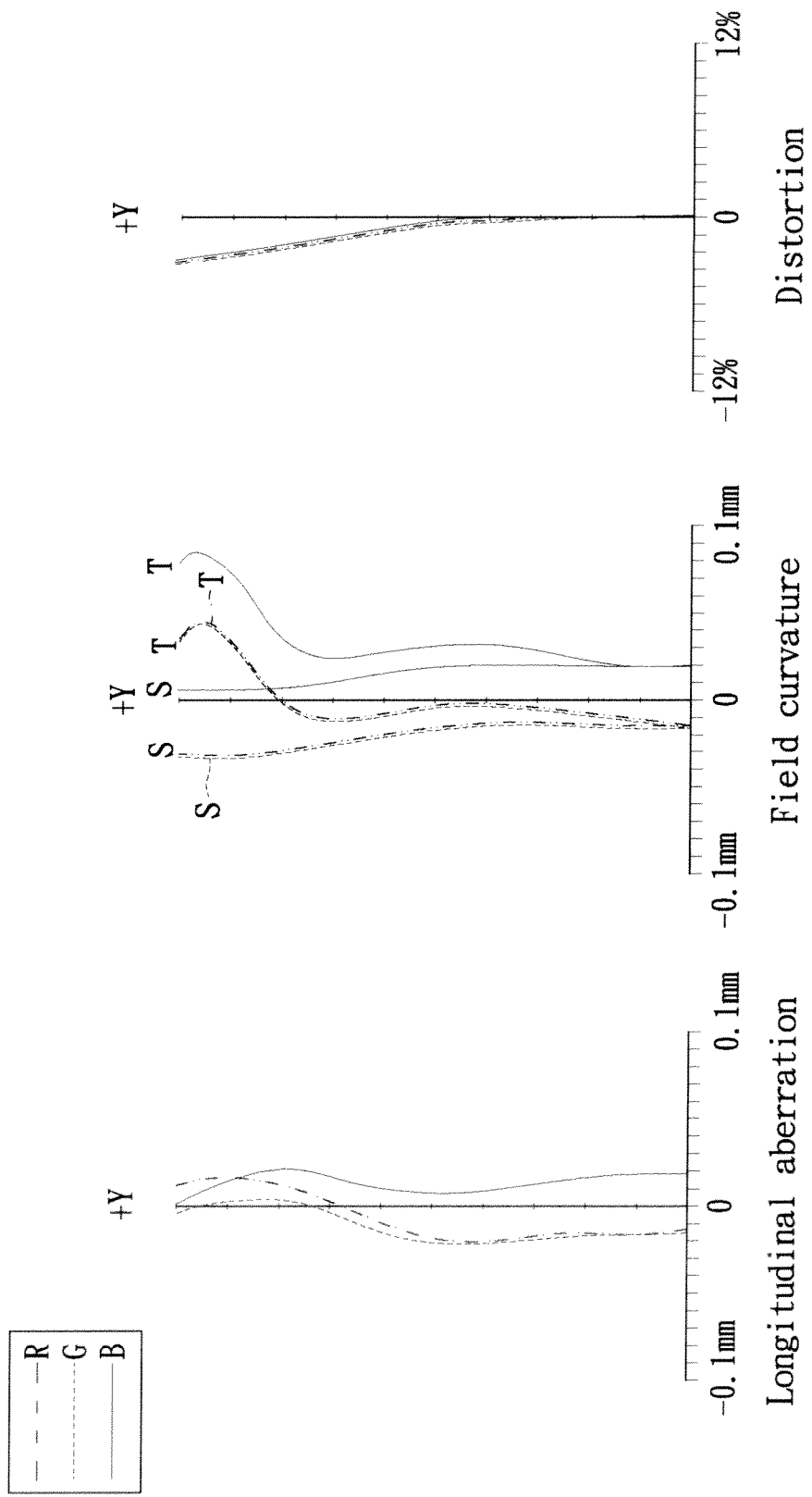
Figure 2F:
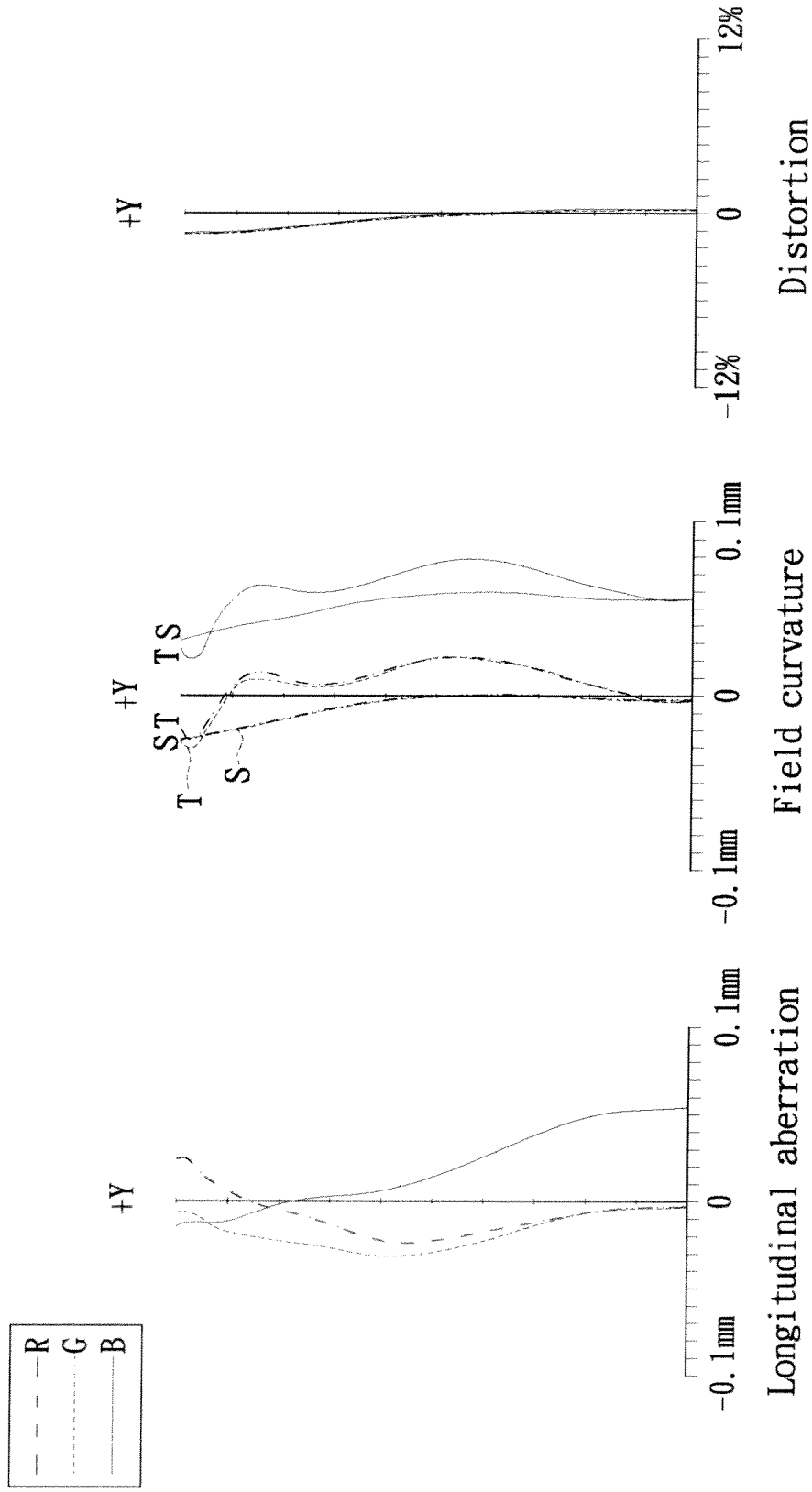

Referring to FIGS. 2D to 2F, where FIG. 2D is a graph showing longitudinal aberration (left), field curvature (middle) and distortion (right) of the zoom lens at wide-configuration according to the second embodiment, respectively. FIG. 2E is a graph showing longitudinal aberration (left), field curvature (middle) and distortion (right) of the zoom lens at normal-configuration according to the second embodiment, respectively. FIG. 2F is a graph showing longitudinal aberration (left), field curvature (middle) and distortion (right) of the zoom lens at tele-configuration according to the second embodiment, respectively.

The simulation data of the second embodiment are shown as the following table:

| surface number | R (curvature radius) | D (distance) | $n_d$ (refractive index) | $V_d$ (Abbe value) |
|---|---|---|---|---|
| 1 | 30.65 | 0.56 | 1.83 | 42.7 |
| 2 | 6.20 | 1.84 | | |
| 3 | −35.06 | 6.00 | 1.53 | 56.0 |
| 4 | 16.97 | 0.52 | | |
| 5 | 24.01 | 0.90 | 1.85 | 23.8 |
| 6 | −59.45 | Variable | | |
| 7 | Infinity | 0.15 | | |
| 8 | 6.00 | 1.00 | 1.53 | 56.0 |

-continued

| surface number | R (curvature radius) | D (distance) | $n_d$ (refractive index) | $V_d$ (Abbe value) |
|---|---|---|---|---|
| 9 | 897.51 | 0.07 | | |
| 10 | 4.29 | 1.73 | 1.53 | 56.0 |
| 11 | 20.47 | 0.23 | | |
| 12 | 6.01 | 0.53 | 1.92 | 18.9 |
| 13 | 2.89 | 0.64 | | |
| 14 | 9.22 | 0.70 | 1.53 | 56.0 |
| 15 | 9.08 | Variable | | |
| 16 | −81.85 | 1.58 | 1.53 | 56.0 |
| 17 | −7.90 | variable | | |

The relationships of the variance D6, D15 and D17 relative to different zoom position are shown as the following table:

| | Wide | Normal | Tele |
|---|---|---|---|
| f | 4.5 | 7.7 | 12.5 |
| $F_{NO}$ | 2.8 | 4.1 | 5.5 |
| FOV(ω) | 33.7° | 21.2° | 13.5° |
| D6 | 9.08 | 4.91 | 0.45 |
| D15 | 1.24 | 8.49 | 13.40 |
| D17 | 4.00 | 0.92 | 0.47 |

Moreover, the optical surface S3, S4, S8-S11 and S14-S17 are aspherical surfaces, and the data of the aspherical surfaces are shown as the following table:

| Surface | K | $A_4$ | $A_6$ | $A_8$ | $A_{10}$ | $A_{12}$ | $A_{14}$ | $A_{16}$ |
|---|---|---|---|---|---|---|---|---|
| S3 | −7.19 | −1.29E−4 | −3.15E−5 | 6.15E−6 | −3.67E−7 | 4.91E−9 | 4.77E−10 | −1.72E−11 |
| S4 | 8.66 | −5.02E−4 | −4.00E−5 | 7.91E−6 | −2.94E−7 | −4.58E−8 | 4.78E−9 | −1.35E−10 |
| S8 | −0.27 | −9.05E−4 | 5.76E−5 | −2.46E−6 | −1.27E−6 | 2.50E−7 | 1.29E−7 | −2.62E−8 |
| S9 | −3.56 | −2.64E−4 | 1.36E−5 | 5.27E−6 | −8.35E−6 | 1.26E−6 | 5.00E−8 | −2.74E−8 |
| S10 | 0 | 9.20E−4 | 1.32E−4 | 3.25E−6 | 1.18E−6 | −5.03E−7 | −7.53E−9 | 0 |
| S11 | 0 | 1.97E−3 | 7.11E−5 | 2.84E−5 | 5.72E−7 | −8.00E−7 | −9.90E−9 | 0 |
| S14 | 0 | −9.95E−5 | −1.65E−4 | −4.06E−5 | −4.45E−6 | 0 | 0 | 0 |
| S15 | 0 | 3.32e−4 | −1.42E−4 | −4.34E−5 | −3.77E−6 | 0 | 0 | 0 |

In addition, the above-mentioned aspherical surfaces in the second embodiment are represented by the same expression as shown in the first embodiment.

Figure 3A:
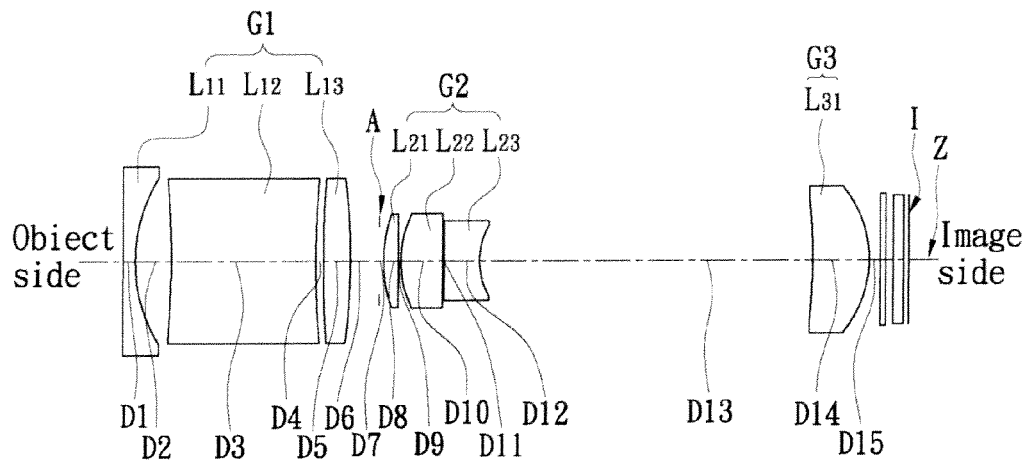
FIGS. 3A-3C are schematic views of the lens groups arranged at wide-configuration of the zoom lens, normal-configuration and tele-configuration according to the third embodiment of the instant disclosure, respectively.
Figure 3B:
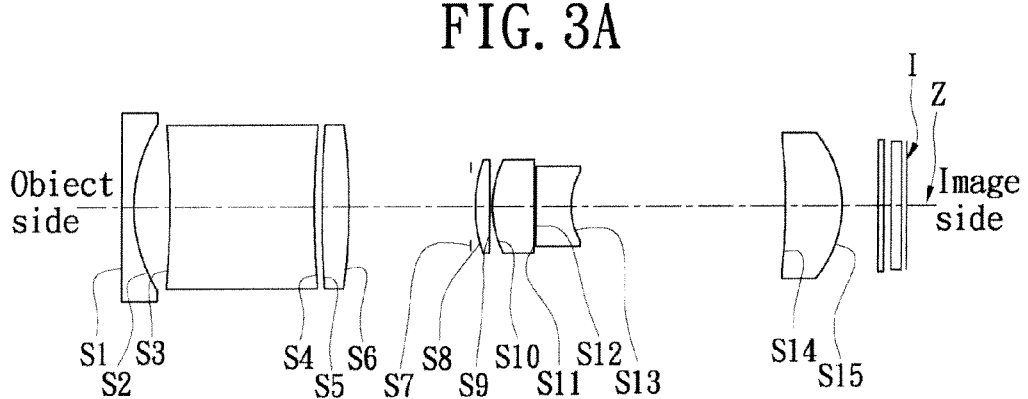
Figure 3C:
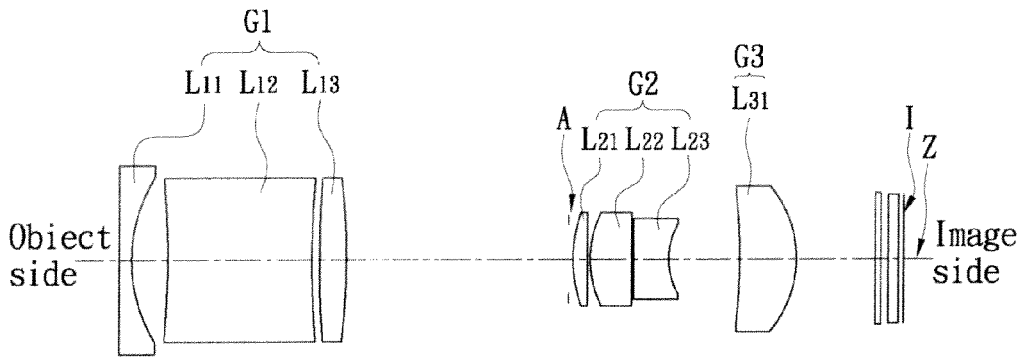

FIGS. 3A to 3C show schematic views of the lens groups of the zoom lens arranged at wide-configuration (FIG. 3A), normal-configuration (FIG. 3B) and tele-configuration (FIG. 3C) according to the third embodiment, respectively. The miniature zoom lens of the third embodiment composed of seven pieces of lens is the same as the first embodiment.

Figure 3D:
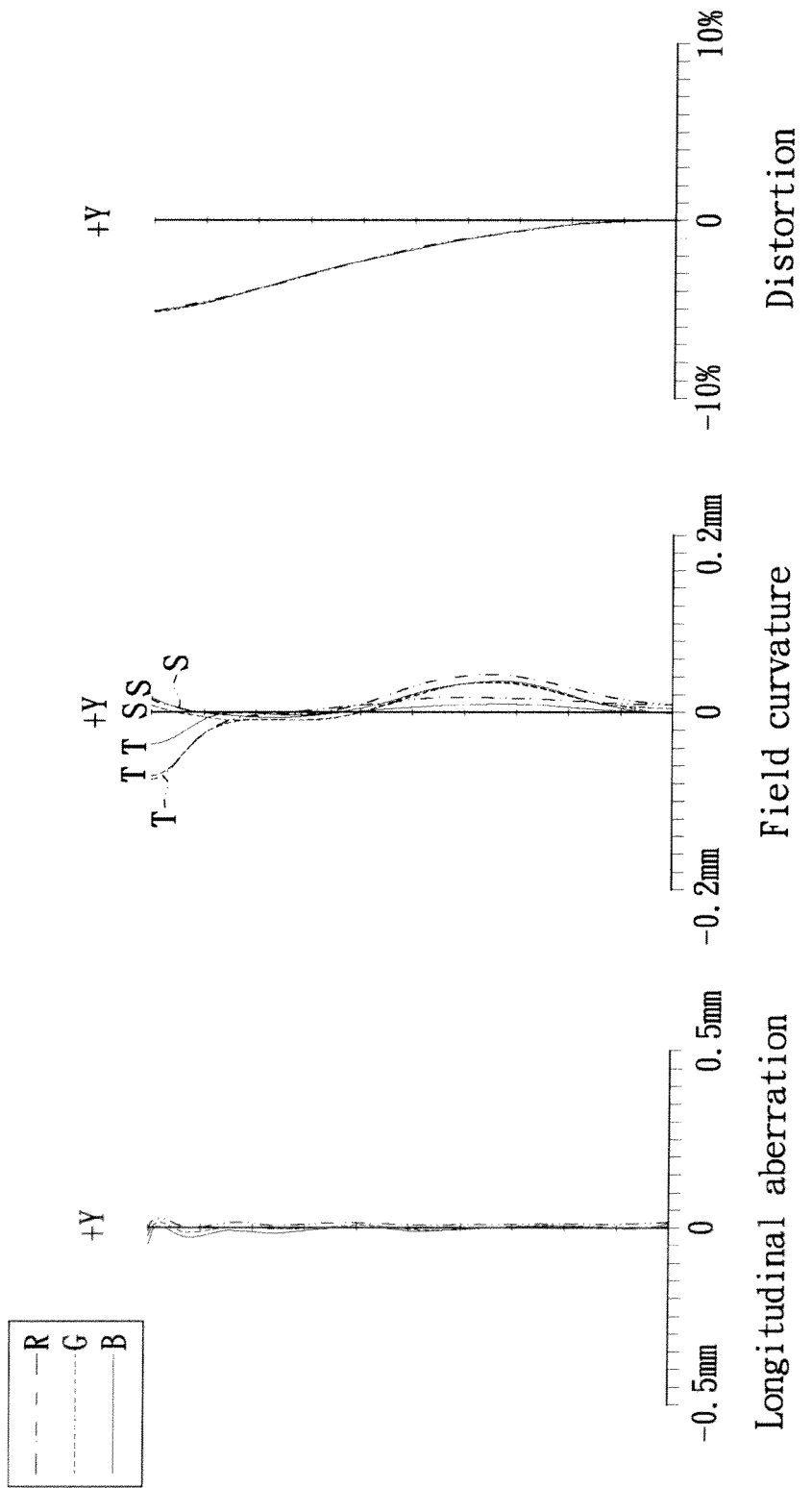
FIGS. 3D-3F are graphs showing longitudinal aberration (left), field curvature (middle) and distortion (right) of the zoom lens at wide-configuration, normal-configuration and tele-configuration according to the third embodiment of the instant disclosure, respectively.
Figure 3E:
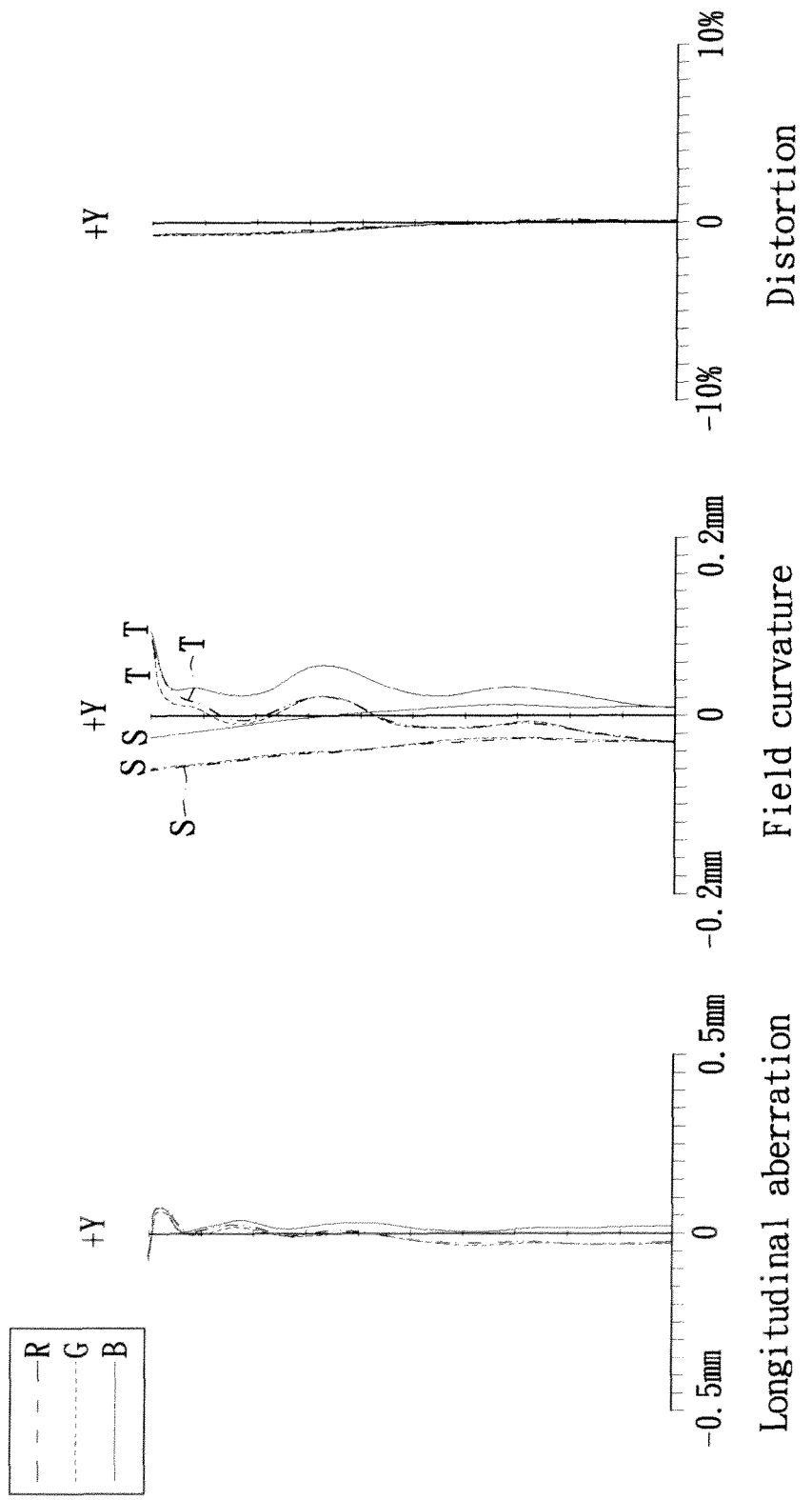
Figure 3F:
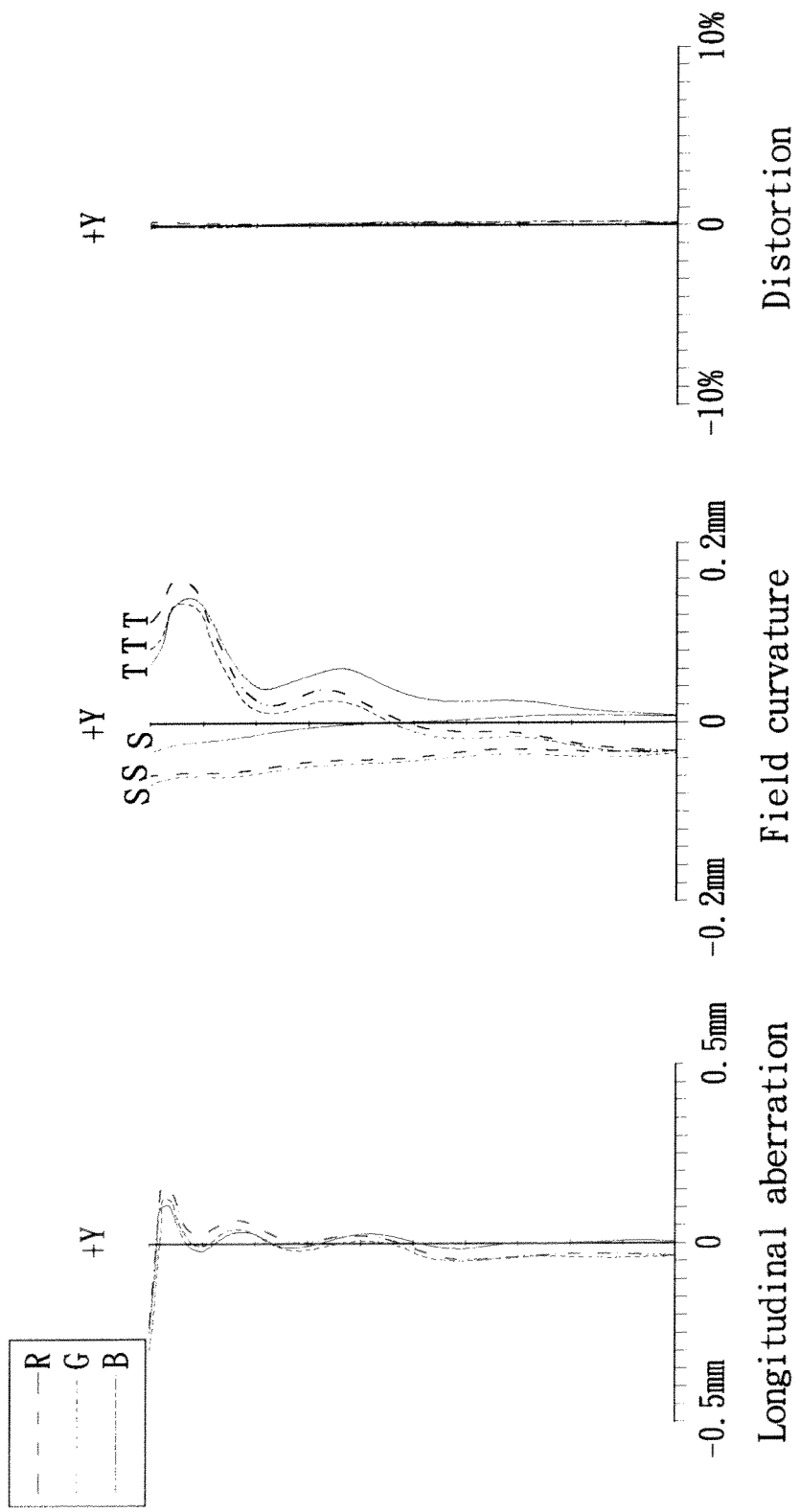

Referring to FIGS. 3D to 3F, where FIG. 3D is a graph showing longitudinal aberration (left), field curvature (middle) and distortion (right) of the zoom lens at wide-configuration according to the third embodiment, respectively. FIG. 3E is a graph showing longitudinal aberration (left), field curvature (middle) and distortion (right) of the zoom lens at normal-configuration according to the third embodiment, respectively. FIG. 3F is a graph showing longitudinal aberration (left), field curvature (middle) and distortion (right) of the zoom lens at tele-configuration according to the third embodiment, respectively.

The simulation data of the second embodiment are shown as the following table:

| surface number | R (curvature radius) | D (distance) | $n_d$ (refractive index) | $V_d$ (Abbe value) |
|---|---|---|---|---|
| 1 | 834.92 | 0.75 | 1.83 | 42.7 |
| 2 | 9.59 | 2.08 | | |
| 3 | −54.86 | 8.7 | 1.53 | 56.0 |
| 4 | 35.05 | 0.46 | | |
| 5 | 44.38 | 1.60 | 1.85 | 23.8 |
| 6 | −43.46 | Variable | | |
| 7 | Infinity | 0.20 | | |
| 8 | 7.38 | 0.89 | 1.53 | 56.0 |
| 9 | 265.11 | 0.10 | | |
| 10 | 6.61 | 2.58 | 1.53 | 56.0 |
| 11 | −29.47 | 0.10 | | |
| 12 | 154.27 | 2.12 | 1.85 | 23.8 |
| 13 | 4.39 | Variable | | |
| 14 | 48.47 | 3.40 | 1.53 | 56.0 |
| 15 | −8.37 | Variable | | |

The relationships of the variance D6, D13 and D15 relative to different zoom position are shown as the following table:

| | Wide | Normal | Tele |
|---|---|---|---|
| f | 6.3 | 10.9 | 17.8 |
| $F_{NO}$ | 3.1 | 4.7 | 6.7 |
| FOV(ω) | 31.8° | 20.2° | 12.5° |
| D6 | 13.50 | 7.46 | 1.83 |
| D13 | 4.19 | 12.67 | 20 |
| D15 | 4.84 | 2.39 | 0.69 |

Moreover, the optical surface S3, S4, S8-S11 and S14-S15 are aspherical surfaces, and the data of the aspherical surfaces are shown as the following table:

| Surface | K | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|---|
| S3 | −30.46 | 1.10E−5 | 2.27E−6 | 3.87E−7 | −2.89E−8 | 6.35E−10 | 1.11E−11 | −4.5E−13 | | |
| S4 | 32.8 | −1.47E−4 | −7.07E−6 | 7.71E−7 | 1.80E−8 | −8.67E−9 | 5.39E−10 | −1.07E−11 | | |
| S8 | 0.06 | −8.67E−4 | −1.74E−4 | 3.40E−4 | −1.66E−4 | 5.24E−5 | −1.10E−5 | 1.40E−6 | −9.73E−08 | 2.76E−09 |

-continued

| Surface | K | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|---|
| S9  | 0     | 1.42E-3  | 1.33E-5  | 1.42E-4  | -3.01E-5 | -4.26E-6 | 1.48E-6  | -1.12E-7 | 1.16E-09  | 5.52E-11 |
| S10 | 0     | 2.73E-3  | 2.26E-4  | -1.08E-4 | 5.22E-5  | -1.65E-5 | 1.84E-6  | 5.84E-8  | -2.42E-08 | 1.20E-09 |
| S11 | 0     | 1.92E-3  | 1.83E-4  | 2.56E-5  | -2.81E-5 | 7.35E-6  | -3.18E-7 | -2.31E-7 | 4.79E-08  | -3.00E-09 |
| S14 | 0     | -8.48E-4 | -8.14E-5 | 4.24E-5  | -1.11E-5 | 1.51E-6  | -1.21E-7 | 5.77E-9  | -1.57E-10 | 1.90E-12 |
| S15 | -6.65 | -1.60E-3 | -7.12E-5 | 2.74E-5  | -4.17E-6 | 3.34E-7  | -1.47E-8 | 3.31E-10 | -2.98E-12 | 2.41E-15 |

In addition, the above-mentioned aspherical surfaces in the third embodiment are represented by the following expression:

$$Z = \frac{CY^2}{1 + \sqrt{(1-(K+1)C^2Y^2)}} + \sum_{2}^{10} A_{2n}Y^{2n};$$

wherein Z is sag, C (=1/r) is the curvature of aspherical surface, K is the conic constant, Y is high vertical to the optical axis Z, $A_4$ is the $4^{th}$ aspherical coefficient. $A_6$ is the $6^{th}$ aspherical coefficient, and $A_8$ to $A_{20}$ may be deduced by analogy.

The data from the first embodiment to the third embodiment are shown as the following table:

|  | First embodiment | Second embodiment | Third embodiment |
|---|---|---|---|
| $\dfrac{F_2}{\sqrt{F_W \cdot F_T}}$ | 1.46 | 1.29 | 1.43 |
| $\left|\dfrac{F1}{F2}\right|$ | 1.33 | 1.96 | 1.24 |
| $\left|\dfrac{F_{12}}{F_{11}}\right|$ | 2.39 | 2.16 | 2.25 |
| $\left|\dfrac{F_{22}}{F_{23}}\right|$ | 1.94 | 1.51 | 1.94 |
| $\left|\dfrac{F_{21}}{F2}\right|$ | 0.90 | 1.17 | 0.94 |
| $V_{11}$-$V_{13}$ | 18.9 | 18.9 | 18.9 |
| $V_{22}$-$V_{23}$ | 32.2 | 37.1 | 32.2 |
| $N_{11}$ | 1.83 | 1.83 | 1.83 |
| $N_{13}$ | 1.85 | 1.85 | 1.85 |
| $N_{23}$ | 1.85 | 1.92 | 1.85 |
| F2/TTL | 0.349 | 0.315 | 0.332 | wherein F1 is the focal length of the first lens group G1, F2 is the focal length of the second lens group G2, $F_W$ is the total focal length at wide-configuration of the zoom lens, $F_T$ is the total focal length at tele-configuration of the zoom lens, $F_{11}$ is the focal length of the first lens $L_{11}$, $F_{12}$ is the focal length of the second lens $L_{13}$, $F_{22}$ is the focal length of the second lens $L_{22}$, $F_{23}$ is the focal length of the third lens $L_{23}$, $F_{21}$ is the focal length of the first lens $L_{21}$, $V_{11}$ is the Abbe value of the first lens $L_{11}$ of the first lens group G1, $V_{13}$ is the Abbe value of the second lens $L_{13}$ of the first lens group G1, $V_{22}$ is the Abbe value of the second lens $L_{22}$ of the second lens group G2, $V_{23}$ is the Abbe value of the third lens $L_{23}$ of the second lens group G2, $N_{11}$ is the refractive index of the first lens $L_{11}$ of the first lens group G1, $N_{13}$ is the refractive index of the second lens $L_{13}$ of the first lens group G1, $N_{23}$ is the refractive index of the third lens $L_{23}$ of the second lens group G2, and TTL is the system total length of the zoom lens.

In conclusion, the instant disclosure has some advantages, for example:

1. The miniature zoom lens of the instant disclosure uses three lens groups only, and the miniature zoom lens has an inner focus structure. In other words, the first lens group is in resting state and the second and the third lens groups are movable during zoom-in or zoom-out operation (the magnification is variable) of the miniature zoom lens, thus the cost is reduced, the manufacture is easy and the assembly is simple in the instant disclosure.

2. The aperture value of the miniature zoom lens of the instant disclosure is adjustable according to different image-capturing applications. For example, when using large aperture value to capture dynamic image, Fno needs to be small; when using high resolution to capture static image, Fno needs to be large.

3. In the miniature zoom ens of the instant disclosure, the first lens group may be composed of at least three lenses, the second lens group may be composed of at least three lenses, and the third lens group may be composed of at least one lens. Hence, the miniature zoom lens can be composed of at least seven pieces of lens for achieving cost is reduced, thus the cost is reduced, the manufacture is easy and the assembly is simple in the instant disclosure.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A miniature zoom lens, comprising:
   a first lens group with negative refractive power fixed at a predetermined position;
   a second lens group with positive refractive power being movable along an optical axis of the zoom lens in accordance with the change of the magnification of the zoom lens; and
   a third lens group with positive refractive power being movable along the optical axis in order to keep an image plane generated by the zoom lens to project accurately onto an image sensor;
   wherein the first, the second and the third lens groups are arranged along the optical axis and from an object side of the zoom lens to an image side of the zoom lens in sequence, and the first lens group and the second lens group conform to the following conditions:

$$\text{condition (1): } 1.2 < \frac{F_2}{\sqrt{F_W \cdot F_T}} < 1.5; \text{ and}$$

$$\text{condition (2): } 1.1 \leq \left|\frac{F1}{F2}\right| \leq 1.25;$$

wherein F1 is the focal length of the first lens group, F2 is the focal length of the second lens group, $F_W$ is the total focal length at wide-configuration of the zoom lens, and $F_T$ is the total focal length at tele-configuration of the zoom lens.

2. The miniature zoom lens of claim 1, further comprising an aperture, wherein the diameter of the aperture is changeable, and the aperture is arranged along the optical axis and between the first lens group and the second lens group.

3. The miniature zoom lens of claim 1, wherein the ratio of the focal length of the second lens group to the total length of the zoom lens is between about 0.3 and about 0.35.

4. The miniature zoom lens of claim 1, wherein the first lens group includes a first lens, a right-angle prism disposed beside the first lens for changing the optical axis by 90 degrees substantially, and a second lens with positive refractive power disposed beside the right-angle prism, wherein the first lens and the second lens of the first lens group conform to the following condition:

$$2.1 \le \left|\frac{F_{12}}{F_{11}}\right| \le 2.5;$$

wherein $F_{11}$ is the focal length of the first lens of the first lens group and $F_{12}$ is the focal length of the second lens of the first lens group.

5. The miniature zoom lens of claim 4, wherein the first lens group is a front fixing group, the first lens of the first lens group is a meniscus lens, and the second lens of the first lens group is a double-convex lens.

6. The miniature zoom lens of claim 4, wherein the first lens and the second lens of the first lens group are made of glass material having a refractive index larger than 1.8.

7. The miniature zoom lens of claim 1, wherein the second lens group includes a first lens, a second lens disposed beside the first lens, and a third lens disposed beside the second lens, and the first, the second and the third lenses of the second lens group are arranged along the optical axis and from the object side of the zoom lens to the image side of the zoom lens in sequence, wherein the second and the third lenses of the second lens group conform to the following condition:

$$1.5 \le \left|\frac{F_{22}}{F_{23}}\right| \le 2.0;$$

wherein $F_{22}$ is the focal length of the second lens of the second lens group and $F_{23}$ is the focal length of the third lens of the second lens group.

8. The miniature zoom lens of claim 7, wherein the second lens group is a variable-power group, the first lens of the second lens group is a single convex lens, and the second and the third lenses of the second lens group are two meniscus lenses separated from each other by a predetermined distance for respectively control field curvature and axial color of the zoom lens.

9. The miniature zoom lens of claim 7, wherein the ratio of the focal length of the first lens of the second lens group to the focal length of the second lens group is:

$$1.85 \le \frac{F_{21}}{F2} \le 1.2;$$

wherein $F_{21}$ is the focal length of the first lens of the second lens group and F2 is the focal length of the second lens group.

10. The miniature zoom lens of claim 7, wherein the third lens of the second lens group is made of glass material having a refractive index larger than 1.8 and an Abbe value less than 30.

* * * * *